(12) United States Patent
Halder

(10) Patent No.: US 7,905,676 B2
(45) Date of Patent: Mar. 15, 2011

(54) BALL-TYPE LOCK PIN

(75) Inventor: Stefan Halder, Achstetten-Bronnen (DE)

(73) Assignee: Erwin Halder KG, Achstetten (DE)

( * ) Notice: Subject to any disclaimer, the term of this patent is extended or adjusted under 35 U.S.C. 154(b) by 958 days.

(21) Appl. No.: 11/392,076

(22) Filed: Mar. 29, 2006

(65) Prior Publication Data
US 2006/0220394 A1   Oct. 5, 2006

(30) Foreign Application Priority Data

Mar. 31, 2005 (DE) ............ 20 2005 005 057 U

(51) Int. Cl.
*F16B 21/00* (2006.01)
(52) U.S. Cl. ............. 403/322.2; 403/322.3; 403/325
(58) Field of Classification Search .......... 403/322.1, 403/325, 322.2, 326, 322.3, 322.4; 24/453, 24/607; 411/348
See application file for complete search history.

(56) References Cited

U.S. PATENT DOCUMENTS

| | | | | |
|---|---|---|---|---|
| 2,373,083 A | * | 4/1945 | Brewster | 411/348 |
| 2,769,363 A | * | 11/1956 | Kight | 411/343 |
| 3,117,484 A | * | 1/1964 | Myers | 411/348 |
| 3,596,554 A | * | 8/1971 | Low et al. | 411/348 |
| 5,394,594 A | * | 3/1995 | Duran | 403/325 |
| 6,112,378 A | * | 9/2000 | Lee | 24/453 |
| 6,334,750 B1 | * | 1/2002 | Hsieh | 24/453 |
| 6,786,669 B2 | * | 9/2004 | Tsui et al. | 403/322.2 |

FOREIGN PATENT DOCUMENTS

GB    971 537    9/1964

* cited by examiner

*Primary Examiner* — Michael P Ferguson
(74) *Attorney, Agent, or Firm* — Andrew Wilford

(57) ABSTRACT

A lock pin has a generally tubular shaft having a front end formed with a radially outwardly open aperture. A locking ball is radially displaceable in the aperture between an outer locking position projecting radially outward from the shaft and an inner position recessed in the shaft. An actuating rod coaxially slidable in the shaft between front and rear positions has a rear end projecting from a rod rear end and a front end at the aperture. The rod has a formation engaging the ball in at least one of its front and rear positions and pressing the ball into its outer locking position. A unitary handle has one end fixed to the rear end of the shaft, an opposite end fixed to the rear end of the rod, and an elastically deformable connecting portion extending between the handle ends and urging the rod into its one position.

8 Claims, 3 Drawing Sheets

BALL-TYPE LOCK PIN

FIELD OF THE INVENTION

The present invention relates to a quick-release fastener. More particularly this invention concerns a ball-type lock pin.

BACKGROUND OF THE INVENTION

In order to lock two interfitting parts together, it is standard to form them with bores that align when they are properly fitted together and insert a ball-type quick-release lock pin into the aligned bores. This pin is normally only stressed in shear and therefore can resist substantial forces.

Such a pin typically comprises an at least partially tubular shaft centered on and extending along an axis and formed at a front end with at least one radially outwardly open aperture. A locking element, typically a ball, is captured in this aperture, normally by providing a lip along its outer edge, so that it can move between a rear locking position projecting from the aperture past an outer surface of the pin and an inner position wholly withdrawn in the aperture and not projecting at all. When in the rear locking position, the element typically fits in an undercut of the bore of one of the parts it is locking together so that it cannot be withdrawn.

While the ball in some systems is spring loaded, for most quick-release structures the pin is provided with an axially extending core rod itself formed with an outwardly open recess. The rod is shiftable axially between an actuated position with its recess aligned with the lock element and into which the element can fit in the inner position and an unactuated position with its outer surface bearing on the ball and forcing the ball into the rear locking position. A spring is braced against the ball and/or the rod to urge the rod into the unactuated position and the ball into the rear locking position. Normally the actuating rod projects from a rear end of the tubular pin so that it can be operated by the user. In the simplest system a ring is fitted to a projecting rear end of the actuating rod so that a pull on this ring releases the lock element and lets the ball retract so the pin can be pulled out. GB 971,537 describes a system where the rear end of the pin forms a chamber around a piston carried on the rear end of the actuating rod so the lock pin can be actuated hydraulically or pneumatically.

The problem with these lock pins is that they are frequently fairly complex and expensive to manufacture. Furthermore the releasing action is often uniaxial, for example comprises a simple pull on the ring of the actuating rod, so that accidental release is a problem.

OBJECTS OF THE INVENTION

It is therefore an object of the present invention to provide an improved ball-type lock pin.

Another object is the provision of such an improved ball-type lock pin that overcomes the above-given disadvantages, in particular that is of simple and inexpensive construction.

A further object is to provide such a quick-release fastener that, in spite of simple construction, has a highly safe biaxial-movement release.

SUMMARY OF THE INVENTION

A lock pin has according to the invention a generally tubular shaft extending along an axis and having a front end formed with a radially outwardly open aperture and a rear end. A locking element is radially displaceable in the aperture between an outer locking position projecting radially outward from the shaft and an inner position recessed in the shaft. An actuating rod coaxially slidable in the shaft between front and rear positions has a rear end projecting from the rod rear end and a front end at the aperture. The rod has a formation engaging the element in at least one of its front and rear positions and pressing the element into its outer locking position. A unitary handle has one end fixed to the rear end of the shaft, an opposite end fixed to the rear end of the rod, and an elastically deformable connecting portion extending between the handle ends and urging the rod into its one position.

Thus the handle forms a biasing spring. This reduces the number of parts of the assembly while making it fairly easy for the system to require the biaxial movement required for safety purposes. The lock pin according to the invention therefore works as well as or better than any standard construction, but is of simpler, cheaper, and more reliable construction.

The connecting portion is U-shaped and open radially inward. Normally according to the invention there are two such U-shaped connecting portions open toward each other and forming a hand hole traversed by the rear end of the rod. This makes the lock pin very easy to operate.

The rear end of the rod is anchored in the opposite end of the handle. In addition the one end of the handle is formed with a socket recess in which the rear end of the shaft is seated. The socket recess and shaft rear end have complementarily interengaging grip formations, as do the anchor for the rod rear end.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
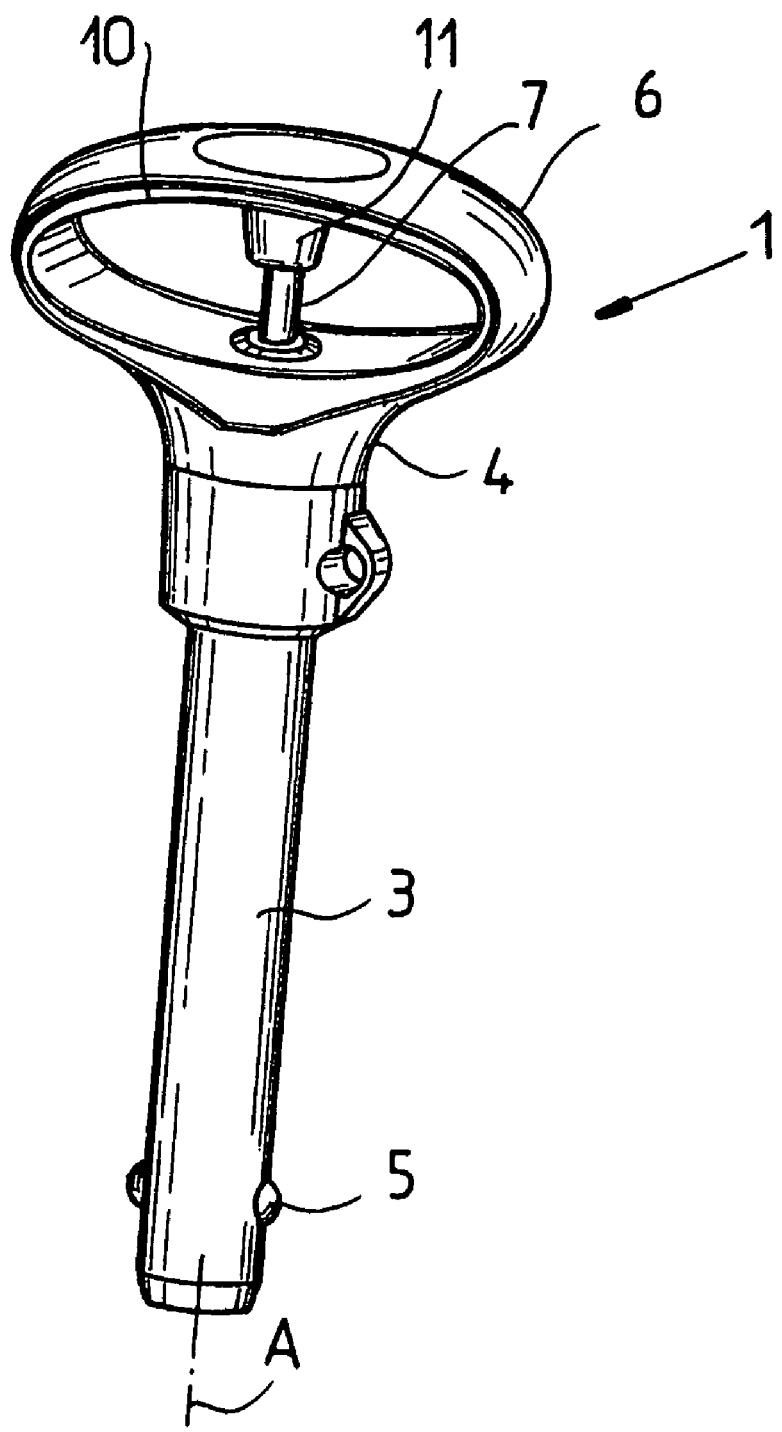
FIG. 1 is a perspective view of the lock pin according to the invention.
Figure 2:
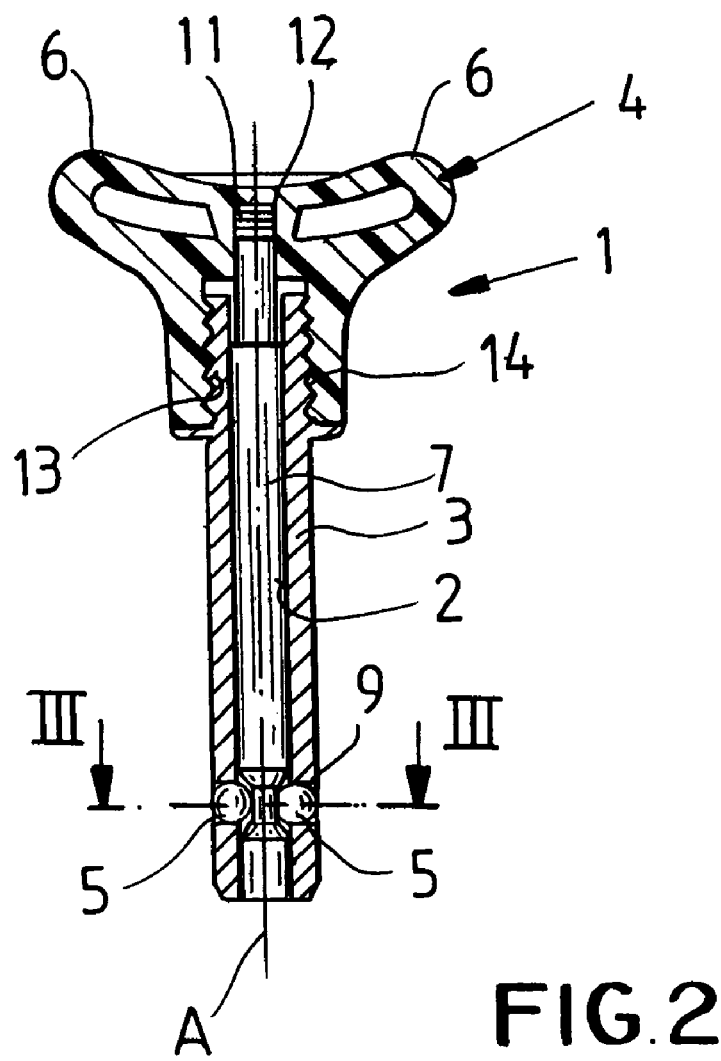
FIG. 2 is an axial section through the lock pin, in the actuated position.
Figure 3:
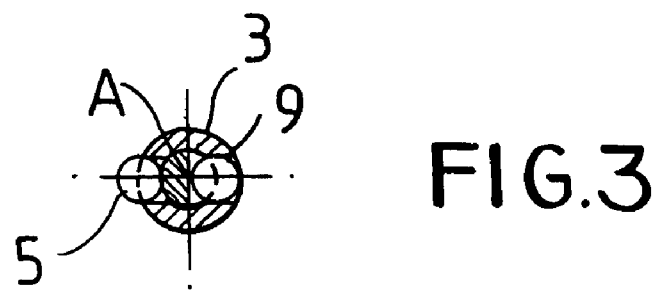
FIG. 3 is a section taken along line III-III of FIG. 2.
Figure 4:
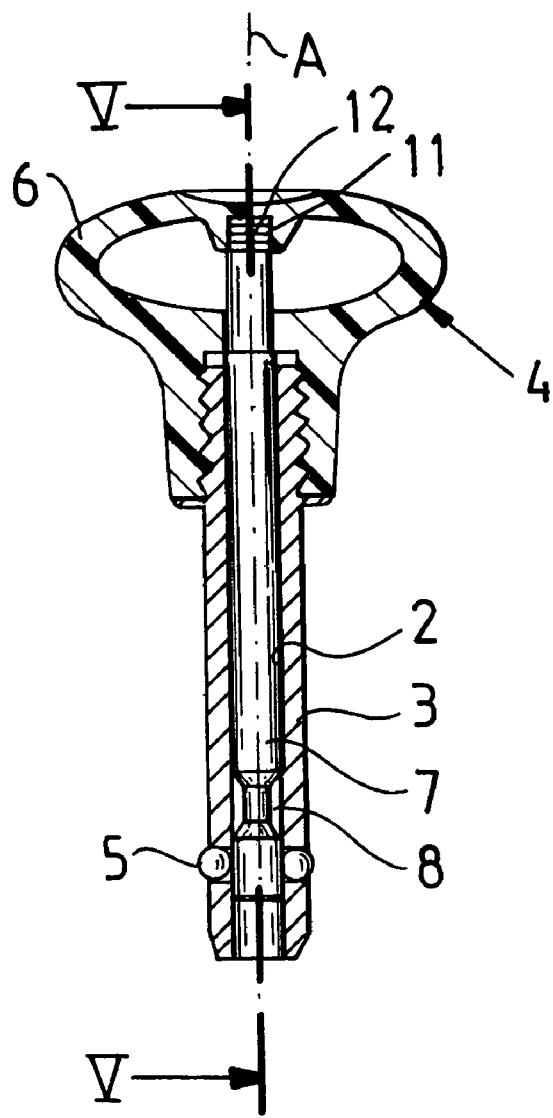
FIG. 4 is an axial section through the lock pin in the unactuated and locking position.
Figure 5:
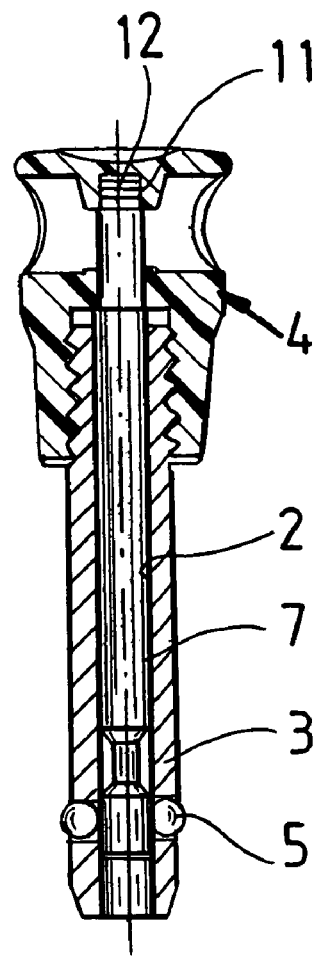
FIG. 5 is an axial section along line V-V of FIG. 4.

As seen in FIGS. 1-5 a lock pin 1 according to the invention is basically centered on an axis A and has a tubular metallic shaft 3 defining an axial passage 2 and having a front end formed with an array of angularly equispaced radially throughgoing apertures 9. A metal rod 7 coaxially received in the passage 2 is axially slidable between a front position (FIG. 2) with a groove or seat 8 on its front end aligned with the apertures 9 and a rear position (FIGS. 4 and 5) with this groove 8 offset from the apertures 9 an its cylindrical outer surface radially aligned with the apertures 9. Respective locking elements formed as balls 5 are captured in the apertures 9 and movable between inner positions (FIG. 2) and outer positions (FIGS. 4 and 5) as the rod 7 moves between its front and rear positions.

A handle 4 made unitarily of an elastically deformable plastic has a front side formed with a seat 13 that fits over the rear end of the tubular shaft 3, and retaining formations 14 constituted as ridges or a screwthread on the rear end of the shaft 3 and in the seat 13 lock the front side of the handle 4 to the shaft 3. A rear side of the handle 4 has an axially centered and forwardly open seat 11 in which the similarly threaded or ridged rear end 12 of the rod 7 is anchored. Integral and elastically deformable webs 6 that are U-shaped and open diametrally toward each other to form a hand hole or eye 10 connect the rear side with the seat 11 to its front side with the seat 13 and urge the rod 7 into the rear position shown in FIGS. 4 and 5 in which it pushes the balls 5 out into the locking or coupling position. The holes 9 have unillustrated retaining bumps or lips to prevent the balls 5 from falling out.

Thus to withdraw the pin 1 according to the invention the user need merely grip the one-piece handle 5 and push its center axially forward (down in FIGS. 2, 4, and 5) while pulling the entire pin 1 axially oppositely rearward. This biaxal movement therefore makes unintentional actuation of the lock pin almost impossible, yet is achieved with an extremely simple structure.

I claim:

1. A lock pin comprising:
   a tube extending along an axis and having a front end formed with a radially outwardly open aperture and a rear end;
   a locking element radially displaceable in the aperture between an outer locking position projecting radially outward from the tube and an inner position recessed in the tube;
   an actuating rod coaxially slidable in the tube between front and rear positions and having a rear end projecting from the tube rear end and a front end at the aperture, the rod having a formation engaging the element in at least one of its front and rear positions and pressing the element into its outer locking position;
   a unitary handle having one end formed with a socket recess in which the rear end of the tube is seated, an opposite end in which the rear end of the rod is anchored, and two elastically deformable connecting portions extending between the handle ends and urging the rod into the one position, the portions and handle ends forming a hand hole through which the rod extends; and
   interengaging grip formations in the socket recess and on the rear end of the tube.

2. The lock pin defined in claim 1 wherein the connecting portions are U-shaped and open radially inward and toward each other.

3. The lock pin defined in claim 1 wherein the connecting portions are U-shaped and open toward each other.

4. The lock pin defined in claim 1 wherein the rear end of the rod is threaded into the opposite end of the handle.

5. The lock pin defined in claim 1 wherein the handle is made wholly of an elastically deformable plastic.

6. The lock pin defined in claim 1 wherein the one position of the rod is the rear position thereof, whereby the rod has to be pushed forward to allow the element to retract into the inner position.

7. The lock pin defined in claim 1 wherein the element is a ball.

8. The lock pin defined in claim 7 wherein there are a plurality of such apertures and respective balls.

* * * * *